Dec. 7, 1937.  J. W. COREY  2,101,807

FERTILIZER

Filed May 13, 1935

| Example Number | Original Charge ||||| Conditions ||| Product |||||
|---|---|---|---|---|---|---|---|---|---|---|---|---|---|
| | Weight of Peat Used (gms.) | % H₂O in Peat | Nitrogenous Material Used | Weight of Nitrogenous Material (gms.) | Total Amount of N Added (gms) | Temperature (°C) | Pressure | Time of Heating (hrs) | Weight of Product (gms.) | % Total N | % Water-Insoluble N | Total N in Product (gms.) | % Recovered N in Product |
| 1 | — | — | Urea (Solid) | 100.0 | 46.6 | Up to 250 | Atm. | Until Fuming Ceased | 48.6 | 37.15 | 23.86 | 18.05 | 39.0 |
| 2 | 67.5 | 25.0 | Urea (Solid) | 45.0 | 21.0 | 225 | Atm. | ⅓ | 76.0 | 16.86 | 9.63 | 12.82 | 61.1 |
| 3 | 60.0 | 0 | Urea (Solid) | 40.0 | 19.73 | 220 | Atm. | ¼ | 73.0 | 14.34 | 11.28 | 10.46 | 53.0 |
| 4 | 35.0 | 25.0 | Urea (Solid) | 10.5 | 4.5 | 205 | 1100 lbs. | 5.5 | 30.0 | 8.47 | 8.26 | 2.55 | 52.0 |
| 5 | 50.0 | 9.0 | Urea (Solid) 40 c.c. H₂SO₄ (conc.) | 25.0 | 11.65 | 225 and 300 | Atm. | 2 and 1 | 50.1 | 15.23 | 11.03 | 7.63 | 65.5 |

Inventor
JOHN W. COREY

By Semmes & Semmes
Attorneys

Patented Dec. 7, 1937

2,101,807

UNITED STATES PATENT OFFICE 2,101,807

FERTILIZER

John W. Corey, Midland, Mich., assignor to The Dow Chemical Company, Midland, Mich., a corporation of Michigan Application May 13, 1935, Serial No. 21,248

14 Claims. (Cl. 71—24)

My invention relates to fertilizers, and in particular to fertilizers compounded from porous organic wastes.

It is an object of the invention to provide a cheap and efficient fertilizer which is easily and simply made from waste starting materials such as peat, straw, sawdust, etc., which ordinarily have small fertilizer value.

A further object of my invention is to provide a fertilizer which is slowly available and in which the dosage can accurately be computed, and which is not greatly affected by heavy rains. Moreover, the fertilizer may be applied in exceptionally heavy dosage without danger of injury to plant life.

Other objects will be apparent from the ensuing description.

Urea has been used as a fertilizer, but it tends to cake on storage when exposed to moisture, and when in this caked condition it is difficult to spread evenly on the land under treatment. Moreover, urea is highly soluble and when there are heavy and repeated rains the urea may be rapidly washed, or leached, from the land.

Furthermore, in using urea as a fertilizer material, care must be observed not to apply the urea in too high a concentration, since high concentrations, e. g. more than .4 per cent by weight at any point in the soil, are known to poison and may even kill plant life. Accordingly, it is customary to apply urea only in a concentration sufficient to provide the necessary plant food for a relatively short time and to refertilize the land during a growing season.

I have discovered that by heating urea to a decomposition temperature in the presence of a porous organic waste material such as peat, straw, etc., a nitrogenous fertilizer rich in water-insoluble nitrogen compounds is produced. I have further discovered that such fertilizer may be applied to land in dosage sufficient to furnish plant food for one or more full growing seasons without danger of injury to plant life. The invention, accordingly, consists in the new fertilizer and method of making the same hereinafter fully described and particularly pointed out in the claims.

The annexed drawing is a table showing data collected during certain experiments hereinafter described as examples.

In preparing my new fertilizer, I heat a porous organic waste material, e. g. peat, straw, sawdust, etc., in the presence of urea to a temperature above 180° C., whereby the urea is decomposed with liberation of ammonia and formation of nitrogenous compounds such as ammelide and cyanuric acid which are relatively insoluble in water and with which the porous organic waste material becomes thoroughly impregnated. A portion of the ammonia liberated by decomposition of the urea usually tends to ammoniate the porous organic waste material with formation of other nitrogenous compounds which are also far less soluble in water than is urea itself. Accordingly, by heating urea to a decomposition temperature in the presence of an organic waste material, according to my method, a far greater proportion of the nitrogen employed is retained in the product than in the product formed by heating urea alone. By carrying my heating operation out in the presence of a mineral acid, e. g. sulphuric, phosphoric, or hydrochloric acid, an even greater proportion of the nitrogen employed may be retained in the fertilizer product.

The heating operation may be carried out at any temperature between 180° and 400° C., but is preferably carried out at temperatures between 190° and 250° C. At temperatures within said preferred range the desired decomposition of urea occurs quite rapidly and the porous organic material, e. g. peat, is not carbonized or otherwise changed in character to as great an extent as at higher temperatures, with the result that the fertilizer product is less friable and more desirable for most types of land than when prepared at higher temperatures. When the heating operation is carried out at 250° C. or above, the desired reaction occurs more rapidly, but the porous organic waste starting material, e. g. peat or other cellulosic, amylaceous, saccharinic, or ligneous waste, is somewhat changed in character from its original form, and the fertilizer product comprises a dried granular material which is friable and which contains ammelide and cyanuric acid, or derivatives thereof, as active fertilizer constituents. It is believed that the ammelide and cyanuric acid may combine with some of the porous organic waste material to form complex organic compounds.

The heating operation may be carried out at any desired pressure. The recovery of nitrogen in the product is usually highest when such operation is carried out at atmospheric pressure or thereabout, but the ratio of water-insoluble nitrogen to total nitrogen in the product is usually highest when the heating operation is carried out in a closed reactor at superatmospheric pressure.

The urea employed in my process may be applied to the porous organic waste material either in solid form or as an aqueous solution thereof.

When applied in solution, the mixture is first heated to dryness after which heating is continued as described above.

A fertilizer prepared in the manner just described is rich in water-insoluble nitrogen compounds, but may contain a small proportion of nitrogen compounds which are soluble in water. If desired, such soluble compounds may be removed by washing the product with water, leaving a nitrogenous fertilizer material in which all of the nitrogen is in slowly available form. Regardless of whether or not it has been washed with water, my fertilizer product is non-hygroscopic and can be stored for long periods of time without caking.

The following examples illustrate certain features of the invention, particularly the improvement in nitrogen recovery brought about by heating urea to a decomposition temperature in the presence of a porous organic waste material rather than alone, but said examples are not to be construed as limiting the invention. The first example is one in which urea was heated alone. It is submitted for purpose of comparison with the other examples wherein urea was heated in the presence of porous organic waste materials.

*Example 1*

100 grams of urea was heated until fumes ceased to be given off, the heating being conducted at atmospheric pressure.

The urea became liquid at 132° C. and at a higher temperature started to boil with an evolution of ammonia. The boiling continued until the material became a white solid. This was cooled, ground and heated until all fuming ceased. There was obtained 48.6 grams of residue consisting substantially of cyanuric acid and ammelide. The nitrogen recovered in this residue is only 39 per cent of that in the original urea.

|  | Percent in the product |
|---|---|
| Total $N_2$ | 37.15 |
| $H_2O$ insoluble $N_2$ | 23.86 |

*Example 2*

67.5 grams of peat (25 per cent $H_2O$) and 45 grams of urea were intimately mixed and heated to 225° C. in a small rotary dryer at atmospheric pressure and allowed to cool slowly so that the stock temperature was above 200° C. for about 20 minutes. The product was removed, weighed, and analyzed. The product weighed 76 grams and contained 16.86 per cent by weight of nitrogen. It contained 9.63 per cent of nitrogen in the form of water-insoluble nitrogen compounds. The nitrogen recovered in the product was 61.1 per cent of the nitrogen present in the urea.

*Example 3*

60 grams of oven-dried peat and 40 grams of urea were mixed and heated rapidly in a small rotary dryer at atmospheric pressure to 220° C. and allowed to cool from this point. The stock temperature was above 200° C. for about 15 minutes. The weight of the product was 73 grams. The total nitrogen was 14.34 per cent in the final product. The insoluble nitrogen in the final product was 11.26 per cent. Of the nitrogen present in the urea, 53 per cent was retained in the product.

*Example 4*

35 grams of peat, containing 25 per cent by weight of water, and 10.5 grams of urea were mixed and heated in a closed reactor at a temperature of 205° C. and pressure of 1100 pounds per square inch gauge for 5.5 hours. The reactor was then permitted to cool, after which the charge was removed. There was obtained 30 grams of solid fertilizer material containing 8.47 per cent by weight of nitrogen. The product contained 8.26 per cent by weight of nitrogen in the form of water-insoluble nitrogen compounds. 52 per cent of the nitrogen contained in the urea was retained in the product.

*Example 5*

40 cc. of concentrated sulphuric acid was mixed with 50 grams of peat (8.8 per cent $H_2O$) and 25 grams of urea. This mixture was heated in a small rotary dryer at 225° C. and atmospheric pressure for 2 hours. The temperature was then raised to 300° C. and heating continued for 1 hour. There was obtained 50.1 grams of product, which contained 15.23 per cent by weight of nitrogen. The water-insoluble nitrogen was 11.03 per cent. The product retained 65.5 per cent of the nitrogen contained in the urea.

The products in Examples 2, 3, and 4 were fairly light in color and retained to a large extent the properties of the peat itself.

By employing porous organic waste materials and forming cyanuric acid and ammelide in situ, I obtain a higher nitrogen recovery than can be obtained by heating urea alone to form ammelide and cyanuric acid.

If desired, other fertilizer ingredients, e. g. potassium and phosphorus compounds, may be incorporated in my fertilizer product so as to provide a complete fertilizer.

I desire that my invention be not further limited than by the scope of the appended claims and the showing of the prior art.

I claim:

1. A fertilizer prepared by heating a mixture of a porous organic material and urea to a temperature at which the urea is decomposed with formation of nitrogen compounds which are relatively insoluble in water.

2. A fertilizer prepared by heating a mixture of a cellular organic material and urea to a temperature at which the urea is decomposed with formation of nitrogen compounds which are relatively insoluble in water.

3. A fertilizer prepared by heating a mixture of peat and urea to a temperature at which the urea is decomposed with formation of nitrogen compounds which are relatively insoluble in water.

4. A fertilizer prepared by heating a mixture of a porous organic material and urea to a temperature above 180° C.

5. A fertilizer prepared by heating a mixture of peat and urea to a temperature between about 190° C. and about 250° C.

6. An ammoniated cellular organic material containing cyanuric acid and ammelide formed in situ by subjecting a mixture of peat and urea to a temperature above 180° C.

7. A method comprising mixing urea with a porous organic waste material and heating the mixture to a temperature above 180° C.

8. A method of making a fertilizer comprising mixing urea with a cellular organic material and heating the mixture to a temperature between 180° and 400° C. for a period of time sufficient to cause substantial decomposition of the urea with formation of nitrogen compounds which are relatively insoluble in water.

9. A method of making a fertilizer comprising heating a solid cellular organic material with urea to a temperature between 190° and 250° C. for a period of time sufficient to cause substantial decomposition of the urea with formation of nitrogenous decomposition products which are relatively insoluble in water.

10. A method of making a fertilizer which comprises heating a solid cellular organic material with urea to a temperature between 190° and 250° C. for a period of time sufficient to cause substantial decomposition of the urea with formation of nitrogenous decomposition products which are relatively insoluble in water, and thereafter washing the mixture with water to remove water-soluble nitrogen compounds therefrom.

11. A method of making a fertilizer which comprises heating peat with urea to a temperature between 190° and 250° C. for a period of time sufficient to cause substantial decomposition of the urea with formation of nitrogenous products which are relatively insoluble in water.

12. A method of making a fertilizer which comprises heating a mixture of urea, a solid porous organic waste material, and a mineral acid to a temperature between 180° and 400° C. for a period of time sufficient to cause substantial decomposition of the urea with formation of nitrogenous products which are relatively insoluble in water.

13. A method of making a fertilizer which comprises heating a solid cellular organic waste material with urea to a temperature between 250° and 400° C.

14. A method of making a fertilizer which comprises heating a solid cellular organic material with urea to a temperature between 180° and 400° C. at superatmospheric pressure for a period of time sufficient to cause substantial decomposition of the urea with formation of solid nitrogenous products which are relatively insoluble in water.

JOHN W. COREY.